(12) United States Patent
Flach et al.

(10) Patent No.: US 6,732,508 B2
(45) Date of Patent: May 11, 2004

(54) EXHAUST SYSTEM FOR AN INTERNAL COMBUSTION ENGINE AND ENGINE COMPRISING THE SAME

(75) Inventors: Thomas A. Flach, S. Vienna, OH (US); Bruce M. Chrisman, Springfield, OH (US)

(73) Assignee: Cooper Cameron Corporation, Houston, TX (US)

( * ) Notice: Subject to any disclaimer, the term of this patent is extended or adjusted under 35 U.S.C. 154(b) by 0 days.

(21) Appl. No.: 09/858,985

(22) Filed: May 16, 2001

(65) Prior Publication Data

US 2002/0194845 A1 Dec. 26, 2002

(51) Int. Cl.$^7$ ............................................. F02B 27/02
(52) U.S. Cl. ............................ 60/312; 60/274; 60/314; 60/322
(58) Field of Search ..................... 60/312, 314, 322, 60/274; 123/681

(56) References Cited

U.S. PATENT DOCUMENTS

| | | | | |
|---|---|---|---|---|
| 3,434,280 A | * | 3/1969 | Burkhart | 60/314 |
| 3,703,937 A | * | 11/1972 | Tenney | 60/314 |
| 3,726,092 A | * | 4/1973 | Raczuk | 60/314 |
| 3,786,791 A | * | 1/1974 | Richardson | 60/314 |
| 4,348,862 A | * | 9/1982 | Fujikawa et al. | 60/314 |
| 4,920,745 A | * | 5/1990 | Gilbert | 60/314 |
| 5,044,159 A | * | 9/1991 | Landfahrer et al. | 60/314 |
| 5,245,824 A | * | 9/1993 | Nouis | 60/314 |
| 5,410,873 A | * | 5/1995 | Tashiro | 123/681 |
| 6,134,885 A | * | 10/2000 | Gilbertson | 60/312 |

FOREIGN PATENT DOCUMENTS

| | | | |
|---|---|---|---|
| JP | 54-17417 | * | 2/1979 |
| JP | 61-116016 | * | 6/1986 |

* cited by examiner

Primary Examiner—Thomas Denion
Assistant Examiner—Tu M. Nguyen
(74) Attorney, Agent, or Firm—Michael P. Hartmann; Peter A. Bielinski

(57) ABSTRACT

An exhaust system for a two-cycle internal combustion engine combusting a normally gaseous hydrocarbon as fuel, the engine having a cylinder having an exhaust port in communication with an exhaust manifold. The exhaust system has an exhaust gas inlet connectable to the exhaust manifold of the internal combustion engine and an exhaust gas outlet spaced from the exhaust gas inlet in the direction of flow of exhaust gas through the system. A first tubular portion is disposed between the exhaust gas inlet and outlet, the first tubular portion diverging in the direction of flow. A second tubular portion is disposed between the exhaust gas inlet and outlet and spaced from the first tubular portion in the direction of flow, the second tubular portion converging in the direction of flow. During operation of the engine to which the exhaust system is connected, a first, negative pressure pulse is generated in a direction opposite to the direction of flow to enhance the removal of exhaust gases from the cylinder through the exhaust port and a second, positive pressure pulse is thereafter generated in the direction opposite to the direction of flow to prevent the flow of freshly charged gas from the cylinder. An internal combustion engine having the exhaust system and a method of operating an internal combustion engine are also provided.

46 Claims, 1 Drawing Sheet

EXHAUST SYSTEM FOR AN INTERNAL COMBUSTION ENGINE AND ENGINE COMPRISING THE SAME

TECHNICAL FIELD OF THE INVENTION

The present invention relates to an exhaust system for use with an internal combustion engine, in particular to a two-stroke internal combustion engine using a normally gaseous hydrocarbon as fuel. The present invention further relates to a two-stroke engine incorporating the exhaust system. Finally, the present invention relates to a method for operating a two-stroke internal combustion engine.

BACKGROUND OF THE INVENTION

Two-stroke (alternatively referred to as two-cycle) engines have been known for many years and have been applied in a range of applications. One class of two-stroke engines is the class of engines operating on a normally gaseous hydrocarbon, most commonly natural gas. Such engines are generally large, slow running engines of a stationary design and find application in the driving of rotating equipment, such as compressors. One example of commercially available engines are the Ajax series of engines manufactured and sold by the Cooper Energy Services division of Cooper Cameron Corporation. The Ajax engines are two-stroke engines having from one to four cylinders. When used to drive a compressor, the Ajax engines are commonly employed in a configuration in which the cylinders of a reciprocating compressor are driven from the same crankshaft as the cylinders of the engine.

Engines in the aforementioned class generally operate at low speeds, that is speeds of the order of from several hundred to a thousand revolutions per minute. The engines are generally operated in a constant speed mode, in which a substantially constant speed is maintained under a variety of engine loads. As the power demand placed on the engine is increased, the combustion efficiency and performance of the engine decreases. In particular, the levels of $NO_x$ in the exhaust gas increases. At a certain level of power demand, the concentration of $NO_x$ in the exhaust gas will exceed the maximum concentrations permitted by the environmental regulations. At this point, the engine can be considered to have reached its maximum acceptable power output. Currently, there is increasing pressure to reduce the level of $NO_x$ emissions from this class of engines. Thus, at present, it is possible to operate such engines under conditions producing $NO_x$ at the rate of 2 g/HP-hr. However, in many regions the relevant regulations already require that $NO_x$ emissions be limited to just 1 g/HP-hr. Still further regions are moving to adopt similar regulations reducing the permitted levels of $NO_x$ emissions. Accordingly, there is a need for a way to reduce $NO_x$ emissions from engines in this class.

One method of reducing the amount of $NO_x$ emitted by such engines is to reduce the maximum power rating of the engine and to operate the engine at a lower level of power output. While this will allow the engine to operate within the lower limits placed on permissible $NO_x$ emissions, this method of operation also limits the useful power obtainable from the engine and, hence, its range of useful applications. An alternative approach is to employ a catalytic converter in the exhaust system of the engine. The catalytic converter removes the $NO_x$ from the exhaust gases before they are emitted to the atmosphere. However, it will be appreciated that the addition of a catalytic converter increases the expense of the engine. In addition, the use of a catalytic converter increases the maintenance required to be performed on the engine, increasing the down time of the engine and, again, increasing costs.

Accordingly, there is a need for a solution to the problem of achieving lower $NO_x$ emissions, while allowing the engine to maintain its existing power rating. The solution should also be available at minimum cost and require little or no additional maintenance over and above the existing maintenance schedules.

SUMMARY OF THE INVENTION

Surprisingly, it has been found that the efficiency of the combustion of the aforementioned two-cycle engines can be significantly increased by the use of an exhaust system tuned to the range of operating speeds of the engine. In particular, this improved efficiency allows the engine to operate with significantly lower $NO_x$ emissions than using a standard exhaust system, while allowing the power output of the engine at the operating speed to remain at the previously achieved levels, or even increased.

Accordingly, in a first aspect, the present invention provides an exhaust system for an internal combustion engine, the engine being a two-cycle engine combusting a normally gaseous hydrocarbon as fuel, the engine comprising a cylinder having an exhaust port in communication with an exhaust manifold, the exhaust system comprising:

an exhaust gas inlet, the inlet being connectable to the exhaust manifold of the internal combustion engine, the exhaust system having a direction of flow being the direction of flow of exhaust gases moving through the exhaust system when the system is connected to the exhaust manifold of the internal combustion engine and the engine is operating;

an exhaust gas outlet spaced from the exhaust gas inlet in the direction of flow, the outlet being connectable to a muffler;

a first tubular portion disposed between the exhaust gas inlet and outlet, the first tubular portion diverging in the direction of flow;

a second tubular portion disposed between the exhaust gas inlet and outlet and spaced from the first tubular portion in the direction of flow, the second tubular portion converging in the direction of flow;

wherein, during operation of the engine to which the exhaust system is connected, a first, negative pressure pulse is generated in a direction opposite to the direction of flow to enhance the removal of exhaust gases from the cylinder through the exhaust port and a second, positive pressure pulse is thereafter generated in the direction opposite to the direction of flow to prevent the flow of freshly charged gas from the cylinder.

While exhaust systems tuned to the operating speed of a two-stroke engine are known in the art, their application has been limited to two-stroke engines of much smaller capacity and operating at speeds far greater than those of the class of engines addressed by the present invention. To date, such a tuned exhaust has not been applied to large capacity two-stroke engines operating on a normally gaseous hydrocarbon fuel and operating at speeds at or below about 1000 rpm. Further, it is most unexpected that such a tuned exhaust can be employed to reduce the $NO_x$ emissions of the engine without sacrificing power output from the engine. It is particularly surprising that the low levels of $NO_x$ emissions can be achieved with the exhaust system of the present invention while achieving increased power output from the engine at a given speed of operation.

In a second aspect, the present invention provides a two-stroke internal combustion engine comprising a cylinder having an inlet port and an exhaust port, the engine further comprising an exhaust system connected to an exhaust manifold in communication with the exhaust port, the exhaust system comprising:

an exhaust gas inlet connected to the exhaust manifold of the internal combustion engine, the exhaust system having a direction of flow being the direction of flow of exhaust gases moving through the exhaust system when the engine is operating;

an exhaust gas outlet spaced from the exhaust gas inlet in the direction of flow;

a muffler connected to the exhaust gas outlet;

a first tubular portion disposed between the exhaust gas inlet and outlet, the first tubular portion diverging in the direction of flow;

a second tubular portion disposed between the exhaust gas inlet and outlet and spaced from the first tubular portion in the direction of flow, the second tubular portion converging in the direction of flow;

wherein, during operation of the engine, a first, negative pressure pulse is generated in a direction opposite to the direction of flow to enhance the removal of exhaust gases from the cylinder through the exhaust port and a second, positive pressure pulse is thereafter generated in the direction opposite to the direction of flow to prevent the flow of freshly charged gas from the cylinder.

In a further aspect, the present invention provides a method of operating a two-stroke internal combustion engine, the method comprising:

supplying a normally gaseous hydrocarbon fuel and an oxygen-containing gas to a cylinder of the engine to provide a combustible mixture within the cylinder;

combusting the combustible mixture to produce an exhaust gas;

allowing the exhaust gas to leave the cylinder through an exhaust gas outlet port;

passing the exhaust gas through a first exhaust gas conduit, the first conduit diverging in the direction of flow of the exhaust gas so as to allow the exhaust gas to expand; and passing the exhaust gas through a second exhaust gas conduit, the second conduit converging in the direction of flow of the exhaust gas so as to compress the exhaust gas;

whereby a first, negative pressure pulse is propagated through the exhaust gas in the opposite direction to the direction of flow to reach the exhaust port and thereby assist with removing exhaust gas from the cylinder; and a second, positive pressure pulse is propagated through the exhaust gas in the opposite direction to the direction of flow to reach the exhaust port and thereby prevent freshly charged gas from leaving the cylinder through the exhaust port.

Specific embodiments of the apparatus and method of the present invention will now be described in detail having reference to the accompanying drawings. The detailed description of these embodiments and the referenced drawings are by way of example only and are not intended to limit the scope of the present invention.

BRIEF DESCRIPTION OF THE DRAWINGS

Preferred embodiments of the present invention will now be described, by way of example only, having reference to the accompanying drawings, in which.

DETAILED DESCRIPTION OF THE PREFERRED EMBODIMENTS

Figure 1:
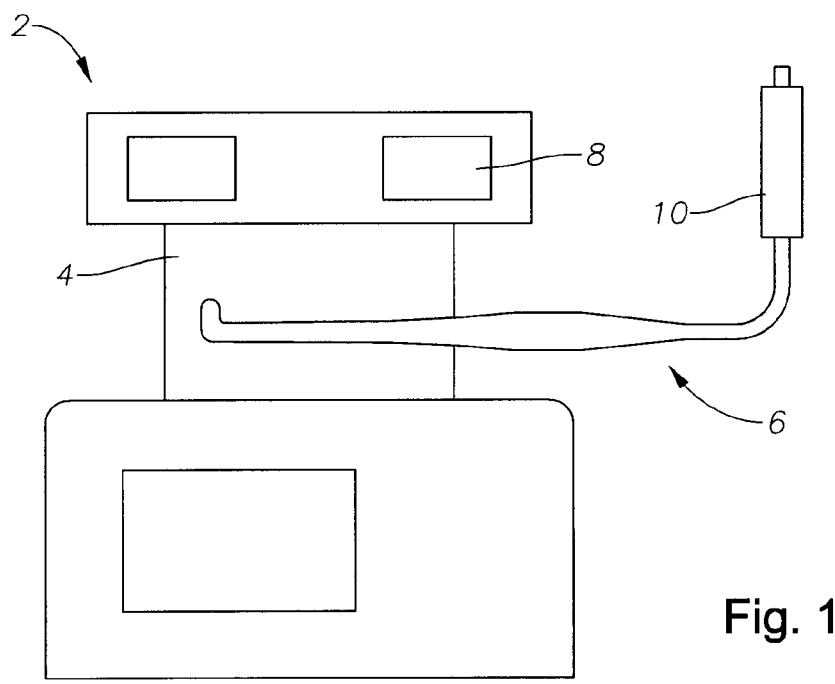
FIG. 1 is a schematic side elevation of an internal combustion engine comprising an exhaust system according to the present invention.

Referring to FIG. 1, a stationary internal combustion engine is generally indicated as 2. The engine is a two-stroke or two-cycle engine. Typically, the engine will have from one to four cylinders 4. An exhaust system 6 is shown extending from an exhaust manifold of the engine, which is connected in turn to the exhaust port of one cylinder of the engine. A cylinder head assembly 8 is shown in FIG. 1. The cylinder head assembly 8 houses the ignition source for each cylinder, for example a conventional spark plug and/or a torch cell. Depending upon the design of the engine, the cylinder head assembly may also house a means for injecting the gaseous hydrocarbon fuel into each cylinder at the appropriate point in the engine's cycle. Details of the ignition system and the fuel injection system (if present in the cylinder head) have been omitted from FIG. 1 for the sake of clarity.

In operation, a piston reciprocates within each cylinder of the stationary engine 2. As the piston descends within the cylinder moving away from the cylinder head, it opens an inlet port, through which a gas or a mixture of gases is admitted and flows into the cylinder. At this time, the cylinder is filled with combusting or burnt gases. In certain designs of engine, a mixture of gaseous fuel and air is admitted into the cylinder through the inlet port at this time. In other designs of engine, such as the Ajax engines referred to above, air alone is admitted to the cylinders through the inlet port. At the same time that the inlet port is open, the descending piston also uncovers an exhaust port, through which the burnt gases leave the cylinder, to form the exhaust gas of the engine. The action of the freshly charged gases entering the cylinder through the inlet port serves to assist with forcing the burnt gases out of the exhaust port, referred to as scavenging. It is during this period in the cycle of the engine that a negative pressure pulse is generated by the exhaust system of the present invention and arrives at the cylinder. This negative pressure pulse draws the burnt gases out of the cylinder through the exhaust port, significantly improving the efficiency of the engine. The negative pressure pulse is preferably timed so as to reach the exhaust port at the time it is opened by the descending piston. It will be appreciated that, once the cylinder is emptied of burnt gases under the combined actions of the incoming fresh charge of gas and the negative pressure induced by the exhaust system, freshly charged gas will begin to leave the cylinder through the exhaust port and enter the exhaust system. This leads to an overall reduction in the efficiency of the engine. Accordingly, at this time, the exhaust system of the present invention generates a pulse of positive pressure at the exhaust port, forcing the freshly charged gas to remain in the cylinder. This pulse of positive pressure is preferably timed to reach the exhaust port at the time that freshly charged gas begins to leave the cylinder through the exhaust port.

The exhaust system of the present invention may be employed on a two-cycle engine operating on a normally gaseous hydrocarbon as its fuel. Suitable fuels include methane, ethane, propane and butane. The exhaust system of the present invention shows particular advantages when used in conjunction with an engine operating on natural gas as a fuel.

A single exhaust system 6 is shown in FIG. 1 for clarity. However, it will be understood that it is generally the case that a separate exhaust system will be provided for each cylinder of the engine. A muffler or silencer 10 is mounted on the end of the exhaust system remote from the engine 2.

Figure 2:
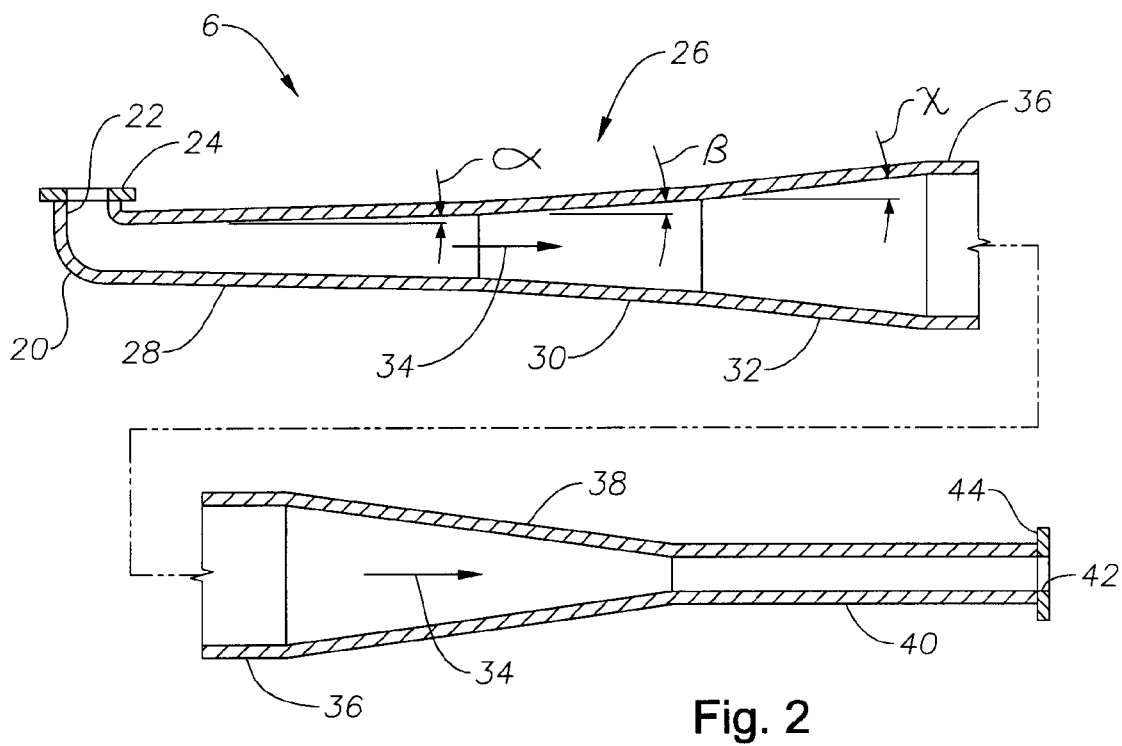
FIG. 2 is a cross-sectional representation of an exhaust system according to the present invention.

FIG. 2 shows a schematic cross-sectional view of the exhaust system 6 of FIG. 1. The exhaust system 6 is shown in FIG. 1 as incorporating a right angle bend, while the system of FIG. 2 is represented as being straight. It will be appreciated that the exhaust system may be a substantially straight assembly. However, the system may also be arranged with one or more bends or curves in its various sections. This allows the system to be arranged so as to be accommodated by the space available around the engine. If the system is constructed with one or more bends, it is important to note that the radius of curvature of the bent sections should be sufficiently large so as not to give rise to a significant pressure drop for the flow of exhaust gases through the system and develop a significant back pressure.

Referring to FIG. 2, the exhaust system 6 comprises an inlet end portion 20 having an inlet opening 22 for connection, via an exhaust manifold, to the exhaust port of a cylinder of the engine. A flange 24 is provided for connecting the inlet end portion 20 of the exhaust system to the exhaust manifold.

A diverging exhaust portion of tubular construction, generally indicated as 26, extends from the inlet end portion 20 and is shown in FIG. 2 as comprising first, second and third diverging sub-portions 28, 30 and 32. The diverging exhaust portion 26 is a portion of the exhaust system having a tubular wall diverging in the direction of flow of exhaust gases through the exhaust system, indicated by the arrows 34 in FIG. 2. A central exhaust portion 36 extends from the third diverging sub-portion 32, the tubular wall of which is of constant diameter throughout its length. A converging exhaust portion 38 extends from the central exhaust portion 36. The converging exhaust portion 38 is of generally tubular construction, the wall of which converges in the direction of flow of exhaust gases through the system, as indicated by the arrows 34. An outlet exhaust portion 40 extends from the converging exhaust portion 38 and is of generally tubular construction having a substantially constant diameter along its length. An outlet opening 42 is defined by an outlet flange 44 on the end of the outlet exhaust portion 40, to which a muffler or silencer may be attached (omitted from FIG. 2 for clarity).

The diverging exhaust portion 26 typically comprises from 40 to 60% of the length of the exhaust system 6, as measured from the inlet opening 22 to the outlet opening 42. Preferably, the diverging exhaust portion 26 makes up from 45 to 55% of the length of the exhaust system 6, with 50% of the length being preferred.

As noted, the diverging exhaust portion 26 is shown in FIG. 2 as comprising three diverging sub-portions 28, 30 and 32. Generally, while a single diverging portion, with a single angle of divergence may be employed, it is preferred that the diverging portion of the exhaust system has walls diverging at an increasing angle to the longitudinal axis of the exhaust system as the diverging portion is traversed in the direction of flow. This in turn allows the rate of expansion of the exhaust gas passing through the exhaust system to be varied as the gas passes from the inlet opening 22 to the outlet opening 42. This may be achieved by constructing the diverging portion with a single tubular wall having a flared cross-section. However, it is more convenient and practical to provide the diverging portion 26 of the exhaust system 6 with a plurality of sub-portions. In this way, the angle of divergence of the wall of the diverging portion may be varied using a plurality of frusto-conical tubular portions. It is preferred that each successive diverging sub-portion has a wall diverging from the longitudinal axis of the exhaust system at a greater angle than the previous sub-portion, as considered in the direction of flow of the exhaust gas. Referring to FIG. 2, the wall of the first diverging sub-portion 28 extends in the direction of flow at angle $\alpha$ to the longitudinal axis of the exhaust system. Similarly, the walls of the second and third diverging sub-portions extend at angles $\beta$ and $\chi$ to the longitudinal axis of the exhaust system. Angle $\beta$ is greater than angle $\alpha$, with angle $\chi$ in turn being greater than angle $\beta$.

In addition to providing the diverging sub-portions with successively increasing angles of divergence, it has been found advantageous if each successive sub-portion is shorter in length than the preceding sub-portion, as considered in the direction of flow of the exhaust gas. Thus, referring to the embodiment shown in FIG. 2, the first diverging sub-portion 28 preferably comprises from 45 to 60% of the length of the diverging portion 26. More advantageously, the first diverging sub-portion 28 comprises from 50 to 55% of the length of the diverging portion 26. The second diverging sub-portion 30 preferably comprises from 25 to 40% of the length of the diverging portion, 26, with a figure of from 30 to 35% being preferred. Finally, the third diverging sub-portion 32 preferably comprises from 10 to 20% of the diverging portion 26, with a value of from 15 to 20% being especially preferred.

The overall dimensions and angle of divergence of the diverging section 26 as a whole and the first, second and third sub-portions 28, 30 and 32, are selected to allow the exhaust gases to expand at the appropriate time and rate in order to provide the necessary negative pressure pulse referred to above. Referring to the embodiment represented in FIG. 2, the angle $\alpha$ is preferably selected to allow the first diverging sub-portion 28 to increase in diameter by from 20 to 40% along its length, more preferably from 25 to 35%. Similarly, the angle $\beta$ is preferably selected whereby the second diverging sub-portion 30 increases in diameter along its length by from 30 to 50%, more preferably from 35 to 45%. Finally, the angle $\chi$ is preferably selected to provide the third diverging sub-portion 32 with an increase in diameter along its length of from 10 to 30%, more preferably from 15 to 25%.

As noted above, the central exhaust portion 36, extending between the diverging portion 26 and the converging portion 38, has a constant diameter along its length. The length of the central exhaust portion 36 preferably ranges from 5 to 15% of the total length of the exhaust system 6, more preferably from 8 to 12%, especially about 10%.

Exhaust gas leaving the central portion 36 of the exhaust system enter the converging portion 38, the action of which is to compress the exhaust gas, in turn giving rise to the pulse of positive pressure referred to and described above. The converging portion 38 may have an angle of convergence, which changes along the direction of flow. However, it has been found advantageous to have the converging portion 38 formed from a single, frusto-conical tubular section, as shown in FIG. 2. The length of the converging section and the angle of convergence of the tubular wall are selected to generate a positive pressure pulse of the right magnitude and at the appropriate time for traveling back in the reverse direction of flow to the engine cylinder. The length of the converging portion 38 is typically less than that of the diverging portion 26, if the best performance is to be obtained. Preferably, the converging portion comprises from 10 to 30% of the total length of the exhaust system, as measured from the inlet opening 22 to the outlet opening 42. More preferably, the converging portion represents from 15 to 25%, especially about 20% of the total length of the system.

It has been found advantageous to have the converging portion 38 converge along its length to a diameter that is at most the same as that of the inlet opening 22 and the inlet portion 20. More preferably, the converging portion 38 converges in the direction of flow to a diameter less than that of the inlet portion 20, in particular to a diameter, which ranges from 40 to 65% of that of the inlet portion, especially from 50 to 60% of the diameter of the inlet portion 20.

The outlet exhaust portion 40, extending from the converging portion 38, has a uniform diameter along its length. The outlet exhaust portion 40 preferably comprises from 10 to 30% of the total length of the exhaust system, as measured from the inlet opening 22 to the outlet opening 42. More preferably, the outlet exhaust portion represents from 15 to 25%, especially about 20% of the total length of the system.

The muffler or silencer 10, shown mounted on the end of the exhaust system in FIG. 1, may be of conventional design, examples of which are available commercially.

The exhaust system may be constructed of any suitable metal, with steel or stainless steel being convenient materials of construction. The gauge of the material of construction is selected to provide the necessary rigidity and strength for the exhaust system. It has been found that thinner gauge material can give rise to increased levels of noise. Accordingly, if it is required or desired to keep noise at a low level, thicker gauge material may be preferred.

The exhaust system of the present invention may be referred to as a tuned system, in that the overall and relative dimensions of the various portions of the system are selected in order to produce the necessary pressure pulses at the appropriate time in the cycle of operation of the engine. Typically, the engines operate at constant speeds in the range of from 200 to 1000 rpm, more typically 250 to 500 rpm. It is possible to tune the exhaust system of the present invention to a particular and precise operating speed of the engine. However, in order to provide some flexibility of operation, it may be preferred to select the constructional parameters of the exhaust system to a central point in a range of engine speeds that may be encountered in the working life of the engine.

The exhaust system of the present invention will now be further described by way of the following specific example.

EXAMPLE

An exhaust system as represented in FIG. 2 was constructed of 10 gauge mild steel. The overall length of the exhaust system was 52 feet, measured from the inlet opening 22 to the outlet opening 42. The inlet opening had a nominal internal diameter of 10 inches. The diverging portion 26 comprised three sub-portions 28, 30 and 32, as shown in FIG. 2, and made up about 50% of the total length of the system. The first diverging sub-portion 28 comprised about 26% of the total length of the exhaust system (about 53% of the length of the diverging portion 26). The angle α employed was such that the wall of the first diverging sub-portion 28 diverged to a maximum nominal internal diameter of 13.3 inches. The second diverging sub-portion 30 comprised about 15% of the total length of the exhaust system (about 31% of the length of the diverging portion 26). The angle β employed was such that the wall of the second diverging sub-portion diverged to a maximum nominal internal diameter of 18.5 inches. The third diverging sub-portion 32 comprised about 8% of the total length of the exhaust system (about 16% of the length of the diverging portion 26). The angle χ employed was such that the wall of the third diverging sub-portion diverged to a nominal internal diameter of 22.5 inches. The central exhaust portion 36 comprised 10% of the total length of the exhaust system. The converging portion 38 comprised 20% of the total length of the exhaust system, converging to a minimum nominal internal diameter of 5.5 inches. The exhaust outlet portion 40 comprised 20% of the total length of the exhaust system.

The exhaust system was connected to an Ajax Aegis 2000 stationary two-stroke internal combustion engine, available commercially from Cooper Energy Services division of Cooper Cameron Corporation. The engine was fueled using natural gas, injected into the cylinders of the engine through the cylinder head assembly. Fresh air was supplied to the cylinder through the inlet port in the cylinder wall. The exhaust system was used in conjunction with a muffler of conventional design.

The engine has a normal operating speed range of from 370 to 440 rpm. The engine was run at a constant speed of 440 rpm with a range of loads applied to the engine. At the operating speed of 440 rpm, the exhaust system provided a maximum pulse of negative pressure at the exhaust port at bottom dead center. The peak pulse of positive pressure was provided to the exhaust port 66° after bottom dead center.

The performance of the exhaust system was determined by monitoring the amount of $NO_x$ produced, in g/BHP-hr, and the brake mean effective pressure (BMEP) of the engine and compared with the performance achieved using a conventional exhaust system. BMEP is defined as the average pressure in a cylinder of the engine for one complete 360° cycle of the engine during operation. For an engine operating at a constant speed and with a constant displacement volume, BMEP is directly proportional to the BHP being produced by the engine. Thus, an increase in BMEP indicates an increase in the BHP being output.

The conventional exhaust system used in the comparison consisted of a tube of uniform nominal internal diameter throughout its length of 16 feet.

The results of the experiment are set out in the Table below, with the exhaust system of the present invention being denoted "Exhaust System A" and the conventional exhaust system being denoted "Exhaust System B". The figures for air flow represent the flow of air measured in standard cubic feet per minute (SCFM) into a single cylinder of the engine.

TABLE

| | Exhaust System A | Exhaust System B |
| --- | --- | --- |
| Exhaust Gas Temperature (° C.) | 700 | 755 |
| Air Flow (SCFM) | 2670 | 2500 |
| $NO_x$ g/BHP-hr | 0.6 | 2.8 |
| CO g/BHP-hr | <1.0 | 1.0 |
| BMEP | 63.7 | 63.7 |
| Compression Pressure (psig) | 240 | 195 |

From the data set out in the Table, it can be seen that the exhaust system of the present invention gives rise to a significant increase in performance of the engine. First, operating a BMEP of 63.7, the exhaust system of the present invention reduces emissions of $NO_x$ to well below both the 2.0 and 1.0 g/BHP-hr regulatory limits. Neither of these limits are achieved using the conventional system, which consequently must be operated at a lower BMEP and, hence, a lower power output. The system traps an increased volume of air in the cylinders of the engine, as shown by the increased values of the air flow and compression pressure, compared with the conventional system. This assists in reducing the overall emissions of $NO_x$ and carbon monoxide (CO), as shown in the Table. When the load applied to the engine is increased, while keeping the operating speed constant at 440 rpm, it is found that the BMEP can be increased to 70.0, with an increase in $NO_x$ to 3.3 g/BHP-hr. Interpolating, this represents a significant increase in the available power before the statutory limit of $NO_x$ of 2.0 g/BHP-hr is reached.

While the preferred embodiments of the present invention have been shown in the accompanying figures and described above, it is not intended that these be taken to limit the scope of the present invention and modifications thereof can be made by one skilled in the art without departing from the spirit of the present invention.

What is claimed is:

1. An exhaust system for an internal combustion engine, the engine being a low speed, two-cycle engine combusting a normally gaseous hydrocarbon as fuel, the engine comprising a cylinder having an exhaust port in communication with an exhaust manifold, the exhaust system comprising:
an exhaust gas inlet, the inlet being connectable to the exhaust manifold of the internal combustion engine, the exhaust system having a direction of flow being the direction of flow of exhaust gases moving through the exhaust system when the system is connected to the exhaust manifold of the internal combustion engine and the engine is operating;
an exhaust gas outlet spaced from the exhaust gas inlet in the direction of flow, the outlet being connectable to a muffler;
a first tubular portion disposed between the exhaust gas inlet and outlet, the first tubular portion diverging in the direction of flow; and
a second tubular portion disposed between the exhaust gas inlet and outlet and spaced from the first tubular portion in the direction of flow, the second tubular portion converging in the direction of flow;
wherein, during operation of the engine to which the exhaust system is connected, a first, negative pressure pulse is generated in a direction opposite to the direction of flow to enhance the removal of exhaust gases from the cylinder through the exhaust port and a second, positive pressure pulse is thereafter generated in the direction opposite to the direction of flow to prevent the flow of freshly charged gas from the cylinder; and
wherein during operation of the engine to which the exhaust system is connected, the first and second pressure pulses are timed to occur so as to reduce $NO_x$ emissions from the engine at a speed in the range of from 250 to 500 rpm.

2. An exhaust system as claimed in claim 1, wherein the first pressure pulse is timed to reach the exhaust port at the time the exhaust port is opened.

3. An exhaust system as claimed in claim 1, wherein the second pressure pulse is timed to reach the exhaust port at the time that freshly charged gas begins to leave the cylinder through the exhaust port.

4. An exhaust system as claimed in claim 1, wherein the hydrocarbon fuel is natural gas.

5. An exhaust system as claimed in claim 1, wherein the length of the second tubular portion is about 20% of the distance from the exhaust gas inlet to the exhaust gas outlet.

6. An exhaust system as claimed in claim 5, wherein the second tubular portion consists of a single converging portion.

7. An exhaust system as claimed in claim 1, wherein the first and second tubular portions are separated by a third tubular portion, the third tubular portion having a substantially uniform cross-sectional area in the direction of flow.

8. An exhaust system as claimed in claim 7, wherein the length of the third tubular portion is about 10% of the distance from the exhaust gas inlet to the exhaust gas outlet.

9. An exhaust system as claimed in claim 1, further comprising an end tubular portion extending from the second tubular portion to the exhaust gas outlet.

10. An exhaust system as claimed in claim 9, wherein the end tubular portion has a substantially uniform cross-sectional area in the direction of flow.

11. An exhaust system as claimed in claim 10, wherein the cross-sectional area of the end tubular portion is less than the cross-sectional area of the exhaust gas inlet.

12. An exhaust system as claimed in claim 1, wherein the length of the first tubular portion is about 50% of the distance from the exhaust gas inlet to the exhaust gas outlet.

13. An exhaust system as claimed in claim 12, wherein the first tubular portion comprises a plurality of adjacent diverging portions, each successive diverging portion in the direction of flow having a greater angle of divergence than the preceding diverging portion.

14. An exhaust system as claimed in claim 13, wherein the first tubular portion comprises successive first, second and third diverging portions extending in the direction of flow.

15. An exhaust system as claimed in claim 14, wherein the length of the first diverging portion is from 50 to 55% of the length of the first tubular portion, the length of the second diverging portion is from 30 to 35% of the length of the first tubular portion, and the length of the third diverging portion is from 15 to 20% of the length of the first tubular portion.

16. A low speed, two-stroke internal combustion engine comprising a cylinder having an inlet port and an exhaust port, the engine further comprising an exhaust system connected to an exhaust manifold in communication with the exhaust port, the exhaust system comprising:
an exhaust gas inlet connected to the exhaust manifold of the internal combustion engine, the exhaust system having a direction of flow being the direction of flow of exhaust gases moving through the exhaust system when the engine is operating;
an exhaust gas outlet spaced from the exhaust gas inlet in the direction of flow;
a muffler connected to the exhaust gas outlet;
a first tubular portion disposed between the exhaust gas inlet and outlet, the first tubular portion diverging in the direction of flow; and
a second tubular portion disposed between the exhaust gas inlet and outlet and spaced from the first tubular portion in the direction of flow, the second tubular portion converging in the direction of flow;
wherein, during operation of the engine, a first, negative pressure pulse is generated in a direction opposite to the direction of flow to enhance the removal of exhaust gases from the cylinder through the exhaust port and a second, positive pressure pulse is thereafter generated in the direction opposite to the direction of flow to prevent the flow of freshly charged gas from the cylinder; and
wherein, during operation of the engine, the first and second pressure pulses are timed to occur so as to reduce $NO_x$ emissions from the engine at a speed in the range of from 250 to 500 rpm.

17. A two-stroke internal combustion engine as claimed in claim 16, wherein the first pressure pulse is timed to reach the exhaust port at the time the exhaust port is opened.

18. A two-stroke internal combustion engine as claimed in claim 16, wherein the second pressure pulse is timed to reach the exhaust port at the time that freshly charged gas begins to leave the cylinder through the exhaust port.

19. A two-stroke internal combustion engine as claimed in claim 16, wherein the hydrocarbon fuel is natural gas.

20. A two-stroke internal combustion engine as claimed in claim 16, wherein the length of the second tubular portion is about 20% of the distance from the exhaust gas inlet to the exhaust gas outlet.

21. A two-stroke internal combustion engine as claimed in claim 20, wherein the second tubular portion consists of a single converging portion.

22. A two-stroke internal combustion engine as claimed in claim 16, wherein the first and second tubular portions are separated by a third tubular portion, the third tubular portion having a substantially uniform cross-sectional area in the direction of flow.

23. A two-stroke internal combustion engine as claimed in claim 22, wherein the length of the third tubular portion is about 10% of the distance from the exhaust gas inlet to the exhaust gas outlet.

24. A two-stroke internal combustion engine as claimed in claim 16, further comprising an end tubular portion extending from the second tubular portion to the exhaust gas outlet.

25. A two-stroke internal combustion engine as claimed in claim 24, wherein the end tubular portion has a substantially uniform cross-sectional area in the direction of flow.

26. A two-stroke internal combustion engine as claimed in claim 25, wherein the cross-sectional area of the end tubular portion is less than the cross-sectional area of the exhaust gas inlet.

27. A two-stroke internal combustion engine as claimed in claim 16, wherein the length of the first tubular portion is about 50% of the distance from the exhaust gas inlet to the exhaust gas outlet.

28. A two-stroke internal combustion engine as claimed in claim 27, wherein the first tubular portion comprises a plurality of adjacent diverging portions, each successive diverging portion in the direction of flow having a greater angle of divergence than the preceding diverging portion.

29. A two-stroke internal combustion engine as claimed in claim 28, wherein the first tubular portion comprises successive first, second and third diverging portions extending in the direction of flow.

30. A two-stroke internal combustion engine as claimed in claim 29, wherein the length of the first diverging portion is from 50 to 55% of the length of the first tubular portion, the length of the second diverging portion is from 30 to 35% of the length of the first tubular portion, and the length of the third diverging portion is from 15 to 20% of the length of the first tubular portion.

31. A method of reducing the $NO_x$ emissions of a low speed, two-stroke internal combustion engine, the method comprising:
    supplying natural gas and an oxygen-containing gas to a cylinder of the engine to provide a combustible mixture within the cylinder;
    combusting the combustible mixture to produce an exhaust gas;
    allowing the exhaust gas to leave the cylinder through an exhaust gas outlet port;
    passing the exhaust gas through a first exhaust gas conduit, the first conduit diverging in the direction of flow of the exhaust gas so as to allow the exhaust gas to expand; and
    passing the exhaust gas through a second exhaust gas conduit, the second conduit converging in the direction of flow of the exhaust gas so as to compress the exhaust gas;
    whereby a first, negative pressure pulse is propagated through the exhaust gas in the opposite direction to the direction of flow to reach the exhaust port at the time that the exhaust port is opened and thereby assist with removing exhaust gas from the cylinder; and
    a second, positive pressure pulse is propagated through the exhaust gas in the opposite direction to the direction of flow to reach the exhaust port when freshly charged gas begins to leave the cylinder through the exhaust port and thereby prevent freshly charged gas from leaving the cylinder through the exhaust port;
    wherein the engine is operated at a speed of from 250 to 500 rpm.

32. A method of operating a low speed, two-stroke internal combustion engine, the method comprising:
    supplying a normally gaseous hydrocarbon fuel and an oxygen-containing gas to a cylinder of the engine to provide a combustible mixture within the cylinder;
    combusting the combustible mixture to produce an exhaust gas;
    allowing the exhaust gas to leave the cylinder through an exhaust gas outlet port;
    passing the exhaust gas through a first exhaust gas conduit, the first conduit diverging in the direction of flow of the exhaust gas so as to allow the exhaust gas to expand; and
    passing the exhaust gas through a second exhaust gas conduit, the second conduit converging in the direction of flow of the exhaust gas so as to compress the exhaust gas;
    whereby a first, negative pressure pulse is propagated through the exhaust gas in the opposite direction to the direction of flow to reach the exhaust port and thereby assist with removing exhaust gas from the cylinder; and
    a second, positive pressure pulse is propagated through the exhaust gas in the opposite direction to the direction of flow to reach the exhaust port and thereby prevent freshly charged gas from leaving the cylinder through the exhaust port;
    wherein the engine operates at a speed in the range of from 250 to 500 rpm.

33. A method of operating a low speed, two-stroke internal combustion engine, the method comprising:
    supplying a normally gaseous hydrocarbon fuel and an oxygen-containing gas to a cylinder of the engine to provide a combustible mixture within the cylinder;
    combusting the combustible mixture to produce an exhaust gas;
    allowing the exhaust gas to leave the cylinder through an exhaust gas outlet port;
    passing the exhaust gas through a first exhaust gas conduit, the first conduit diverging in the direction of flow of the exhaust gas so as to allow the exhaust gas to expand; and
    passing the exhaust gas through a second exhaust gas conduit, the second conduit converging in the direction of flow of the exhaust gas so as to compress the exhaust gas;
    whereby a first, negative pressure pulse is propagated through the exhaust gas in the opposite direction to the direction of flow to reach the exhaust port and thereby assist with removing exhaust gas from the cylinder; and
    a second, positive pressure pulse is propagated through the exhaust gas in the opposite direction to the direction of flow to reach the exhaust port and thereby prevent freshly charged gas from leaving the cylinder through the exhaust port;
    wherein the first and second pressure pulses are timed to occur so as to reduce $NO_x$ emissions from the engine at a speed in the range of from 250 to 500 rpm.

34. A method as claimed in claim 33, wherein the first pressure pulse arrives at the cylinder at the time that the exhaust port is opened.

35. A method as claimed in claim 33, wherein the second pressure pulse arrives at the cylinder when freshly charged gas begins to leave the cylinder through the exhaust port.

36. A method as claimed in claim 33, wherein the exhaust gas leaving the second exhaust gas conduit passes through a third exhaust gas conduit of substantially uniform cross-sectional area.

37. A method as claimed in claim 33, wherein the normally gaseous hydrocarbon fuel is natural gas.

38. A method as claimed in claim 33, wherein the rate of expansion of the exhaust gas in the first exhaust gas conduit increases as the exhaust gas proceeds in the direction of flow.

39. A method as claimed in claim 38, wherein the rate of expansion of the exhaust gas increases stepwise in the direction of flow.

40. A method of reducing the $NO_x$ emissions of a low speed, two-stroke internal combustion engine, the method comprising:

supplying a normally gaseous hydrocarbon fuel and an oxygen-containing gas to a cylinder of the engine to provide a combustible mixture within the cylinder;

combusting the combustible mixture to produce an exhaust gas;

allowing the exhaust gas to leave the cylinder through an exhaust gas outlet port;

passing the exhaust gas through a first exhaust gas conduit, the first conduit diverging in the direction of flow of the exhaust gas so as to allow the exhaust gas to expand; and passing the exhaust gas through a second exhaust gas conduit, the second conduit converging in the direction of flow of the exhaust gas so as to compress the exhaust gas;

whereby a first, negative pressure pulse is propagated through the exhaust gas in the opposite direction to the direction of flow to reach the exhaust port and thereby assist with removing exhaust gas from the cylinder; and a second, positive pressure pulse is propagated through the exhaust gas in the opposite direction to the direction of flow to reach the exhaust port and thereby prevent freshly charged gas from leaving the cylinder through the exhaust port; and wherein the engine operates at a speed in the range of from 250 to 500 rpm.

41. A method as claimed in claim 40, wherein the first pressure pulse arrives at the cylinder at the time that the exhaust port is opened.

42. A method as claimed in claim 40, wherein the second pressure pulse arrives at the cylinder when freshly charged gas begins to leave the cylinder through the exhaust port.

43. A method as claimed in claim 40, wherein the exhaust gas leaving the second exhaust gas conduit passes through a third exhaust gas conduit of substantially uniform cross-sectional area.

44. A method as claimed in claim 40, wherein the normally gaseous hydrocarbon fuel is natural gas.

45. A method as claimed in claim 40, wherein the rate of expansion of the exhaust gas in the first exhaust gas conduit increases as the exhaust gas proceeds in the direction of flow.

46. A method as claimed in claim 45 wherein the rate of expansion of the exhaust gas increases stepwise in the direction of flow.

* * * * *